(No Model.)
J. R. MORRIS.
SELF HEALING PNEUMATIC TIRE.
No. 496,528. Patented May 2, 1893.
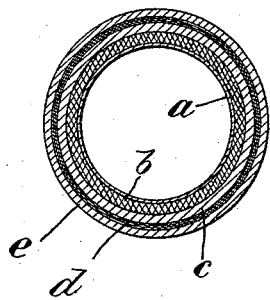
Attest:
Inventor:
James R. Morris
by his attorneys.

United States Patent Office.

JAMES R. MORRIS, OF PASSAIC, NEW JERSEY, ASSIGNOR TO THE NEW YORK BELTING AND PACKING COMPANY, LIMITED, OF ENGLAND.

SELF-HEALING PNEUMATIC TIRE.

SPECIFICATION forming part of Letters Patent No. 496,528, dated May 2, 1893.

Application filed October 15, 1892. Serial No. 449,006. (No model.)

*To all whom it may concern:*

Be it known that I, JAMES R. MORRIS, of the city and county of Passaic, in the State of New Jersey, have invented a new and useful Improvement in Self-Healing Pneumatic Tires, which invention is fully set forth in the following specification.

The object of this invention is to cause pneumatic or inflated rubber tires for the wheels of bicycles and other vehicles, to be self-healing. A self-healing pneumatic tire is one that will not leak on being pierced or punctured by accident under the ordinary conditions to which such tires are subjected when in use. Inflated rubber tires are so well known that their general structure needs no special description.

My invention consists in a mode of using unvulcanized india rubber in the structure of the tire. This unvulcanized rubber is softer and more sticky than vulcanized rubber. I prefer for this purpose to use a mixture of Assam rubber and Para rubber. Assam rubber serves to give the desired softness and stickiness to the unvulcanized rubber portion of the tire. When a piece of glass or nail or other similar substance is encountered by the tire when in use and the same pierces the tire, it either remains in the tire or becomes withdrawn. If it remains in the tire, in passing through the soft unvulcanized rubber, contact is so close as to prevent the leakage of air, while if the foreign substance is withdrawn the softness of the rubber causes it to immediately close the hole and thus the tire is kept air tight. The air pressure within serves to close the aperture and prevents the collapse of the tire.

I will now proceed to describe the construction of a self-healing pneumatic tire, embracing my improvement. Pneumatic tires are tubes made of india rubber, or layers of canvas coated with india rubber, or of layers of rubber combined with layers of canvas.

In describing my structure I will begin at the inside of the tube and describe the successive layers from the inside of the tube outwardly.

The inner surface of the tire is composed of a layer of unvulcanized india rubber forming a tube. Next outside of that is a layer or tube of vulcanized india rubber. Next outside of that are three or four plies of cloth. I prefer to use fine S sheeting, and it is best to coat the plies of cloth with a friction or other coat of india rubber. Next outside of the plies of sheeting is a tube or layer of vulcanized india rubber, and next outside of that is a protection strip of the kind usually used as the outermost portion of a rubber cycle tire. In order to prevent the layer of unvulcanized india rubber, which forms the innermost part of the tire, from sticking in case the tire should be collapsed, it is advisable to have an innermost coating of sleazy jute cloth or cheese cloth, or some other loosely woven fabric. If the cloth which is placed upon the inner surface of the unvulcanized inner tube, is too closely woven, it will interfere with its self-healing operation.

If any foreign substance should prick the tire, it would first encounter the protection strip, then a layer of vulcanized rubber, and then the plies of sheeting, then the layers of vulcanized rubber, and finally it would pierce the unvulcanized layer and thus reach the air in the center of the tube. On being withdrawn, the unvulcanized portion would by its stickiness and tackiness close up the aperture and prevent the air from escaping; but this operation as already suggested might be interfered with if there was adhering to the inner side of the unvulcanized tube, cloth of so firm a texture as to hold back the parts immediately surrounding the aperture, and prevent their closing.

The drawing represents a cross-section of the tire made according to my invention, and having an innermost coating of sleazy jute cloth or its equivalent.

$a$ represents the layer of loosely woven cloth.
$b$ represents the layer of unvulcanized india rubber.
$c$ represents the next layer of vulcanized india rubber.
$d$ represents the plies of cloth.
$e$ represents the next layer of vulcanized india rubber, and outside of that is the protection strip, which is not represented because it is commonly used for the exterior coating of tires of this description.

The unvulcanized rubber is kept in that state during the heating, from the fact that it is not combined with sulphur, the omission of that substance making it incapable of vulcanization.

I have mentioned unvulcanized rubber as a substance which I believe to be best adapted for the purposes above described, but I do not confine myself to its use, as other substances having analogous semi-plastic properties, could be used for the same purpose, and when so used would be the equivalents of the unvulcanized rubber described as forming part of my improved self-healing tire.

What I claim, and desire to secure by Letters Patent, is—

1. A pneumatic cycle tire composed of the following elements: an inner layer of unvulcanized india rubber coated on its inside with a coating of loosely woven fabric, a layer of vulcanized india rubber, two or more plies of cloth, and a layer of vulcanized india rubber the same being constructed substantially as described.

2. A pneumatic tire containing an innermost layer of unvulcanized rubber, the same being protected by an inner coating or lining of comparatively loosely woven fabric, substantially as and for the purposes set forth.

In testimony whereof I have signed this specification in the presence of two subscribing witnesses.

JAMES R. MORRIS.

Witnesses:
W. W. SCOTT,
GEO. A. McDANOLDS.